(12) United States Patent
Schmitz

(10) Patent No.: US 10,233,964 B2
(45) Date of Patent: Mar. 19, 2019

(54) CARABINER

(71) Applicant: Batz Corporation, Prattsville, AR (US)

(72) Inventor: Hans-Jörg Schmitz, Heiligenhaus (DE)

(73) Assignee: Batz Corporation, Prattsville, AR (US)

( * ) Notice: Subject to any disclaimer, the term of this patent is extended or adjusted under 35 U.S.C. 154(b) by 47 days.

(21) Appl. No.: 15/183,820

(22) Filed: Jun. 16, 2016

(65) Prior Publication Data

US 2017/0335882 A1 Nov. 23, 2017

(30) Foreign Application Priority Data

May 23, 2016 (DE) .................... 10 2016 109 408

(51) Int. Cl.
*F16B 45/02* (2006.01)
*A01K 27/00* (2006.01)

(52) U.S. Cl.
CPC ............ *F16B 45/02* (2013.01); *A01K 27/005* (2013.01)

(58) Field of Classification Search
CPC ....................................................... F16B 45/02
See application file for complete search history.

(56) References Cited

U.S. PATENT DOCUMENTS

| | | | | |
|---|---|---|---|---|
| 1,356,830 A | * | 10/1920 | Rohrbach | ............... F16B 45/02 24/599.9 |
| 1,516,875 A | * | 11/1924 | Allen | ..................... F16B 45/00 24/599.6 |
| 1,626,866 A | * | 5/1927 | Neilson | ................... E21B 19/04 24/599.7 |
| 3,008,210 A | * | 11/1961 | Stovern | ..................... B66C 1/36 294/82.19 |
| 4,868,954 A | * | 9/1989 | Kasai | ..................... A45C 13/30 24/265 H |
| 5,127,219 A | * | 7/1992 | Herron | ..................... B60D 1/28 24/599.4 |
| 5,274,887 A | * | 1/1994 | Fudaki | ................... A44B 11/28 24/265 H |
| 5,475,901 A | * | 12/1995 | Anscher | ............... F16B 21/073 24/265 H |
| 5,502,878 A | * | 4/1996 | Anscher | ............... F16B 21/071 24/265 H |

(Continued)

FOREIGN PATENT DOCUMENTS

EP 1 522 748 B1 4/2005

*Primary Examiner* — Jason W San
(74) *Attorney, Agent, or Firm* — Gudrun E. Huckett

(57) ABSTRACT

A carabiner has a hock body with a foot section, a back section connected to the foot section, a top section connected to the back section and bent like a hook in the direction of the foot section, a lug arranged at the foot section, and a snap tongue pivotally linked to the foot section and having the form of a wire which is bent to a U-shackle and is made of spring steel. The U-limbs of the U-shackle have different lengths and the ends of the U-limbs are bent inwardly and are inserted into bearing openings which are arranged in the region of the foot section such that the snap tongue, in the closed position of the carabiner, contacts spring loaded the inner surface of the top section which is bent in the direction of the foot section. A retaining element prevents the accidental displacement of the snap tongue out of its contact position against the inner surface of the end portion of the top section bent into the direction of the foot section.

4 Claims, 3 Drawing Sheets

(56) References Cited

U.S. PATENT DOCUMENTS

| | | | | |
|---|---|---|---|---|
| 5,566,428 | A * | 10/1996 | Takahashi | B29C 45/0017 24/265 H |
| 5,664,304 | A * | 9/1997 | Tambornino | B66C 1/36 24/370 |
| 5,878,834 | A * | 3/1999 | Brainerd | F16B 45/02 182/3 |
| 5,937,490 | A * | 8/1999 | Mihailovic | F16B 45/02 24/599.4 |
| D443,502 | S * | 6/2001 | Yoshiguchi | D8/367 |
| 6,317,940 | B1 * | 11/2001 | Matoba | F16B 45/02 24/600.9 |
| 6,519,818 | B1 * | 2/2003 | Chang | B66C 1/36 24/599.4 |
| 6,557,329 | B2 * | 5/2003 | Schmidt | A01K 75/00 24/265 H |
| 6,772,488 | B1 * | 8/2004 | Jensen | F16B 45/02 24/598.6 |
| 7,992,263 | B2 * | 8/2011 | Uehara | A45F 5/00 24/265 H |
| 8,156,617 | B2 * | 4/2012 | Schwappach | F16B 45/02 24/599.5 |
| 8,590,120 | B2 * | 11/2013 | Sakai | A01K 27/005 24/600.7 |
| 9,453,527 | B2 * | 9/2016 | Yoo | F16B 45/00 |
| 9,630,809 | B2 * | 4/2017 | Hoover | B66C 1/36 |
| 2004/0036303 | A1 * | 2/2004 | Yu | F16B 45/02 294/82.19 |
| 2005/0071961 | A1 | 4/2005 | Maurice et al. | |
| 2006/0085954 | A1 * | 4/2006 | Chen | F16B 21/12 24/265 H |
| 2007/0193005 | A1 * | 8/2007 | Chalk | A01K 27/003 24/265 H |
| 2007/0261210 | A1 * | 11/2007 | Chen | F16B 21/165 24/265 H |
| 2007/0294867 | A1 * | 12/2007 | Lin | F16B 45/04 24/600.4 |
| 2008/0022497 | A1 * | 1/2008 | Thompson | F16B 45/02 24/598.1 |
| 2008/0141499 | A1 * | 6/2008 | Chung | F16B 45/02 24/265 H |
| 2009/0208274 | A1 * | 8/2009 | Liang | F16G 15/08 403/164 |
| 2009/0265901 | A1 * | 10/2009 | Berney | F16B 45/00 24/591.1 |
| 2010/0139052 | A1 * | 6/2010 | Lin | F16B 45/04 24/265 H |
| 2011/0247183 | A1 * | 10/2011 | Tylaska | F16B 45/02 24/601.5 |
| 2012/0210542 | A1 * | 8/2012 | Yang | F16B 21/165 224/369 |
| 2015/0226254 | A1 * | 8/2015 | Nonoguchi | A01K 27/005 24/524 |
| 2015/0322996 | A1 * | 11/2015 | Mitchell | F16B 45/04 24/303 |
| 2016/0037869 | A1 * | 2/2016 | Adelman | A44B 15/00 24/531 |
| 2016/0189578 | A1 * | 6/2016 | Wicken | G09F 7/18 248/306 |
| 2017/0023176 | A1 * | 1/2017 | Goetsch | F16M 13/022 |

* cited by examiner

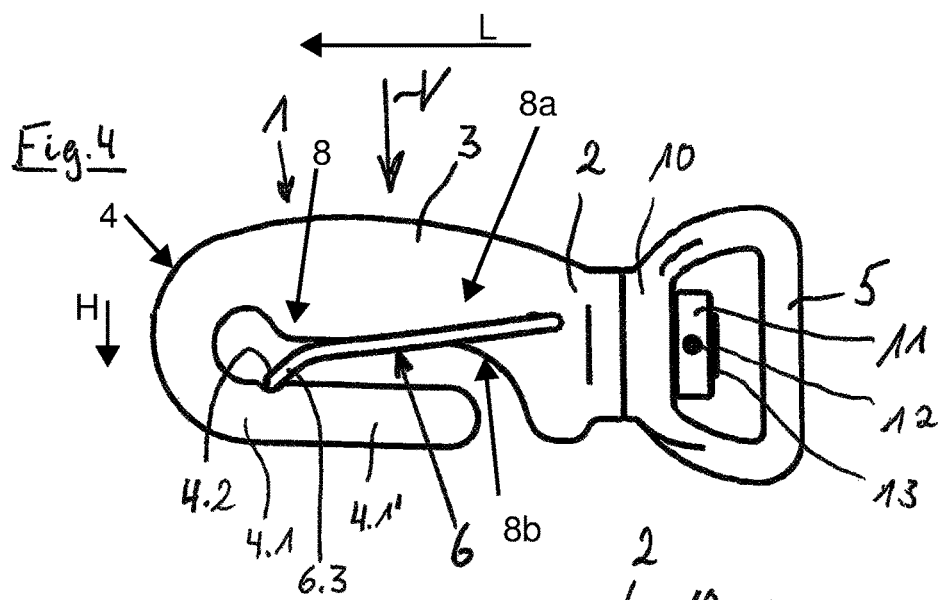
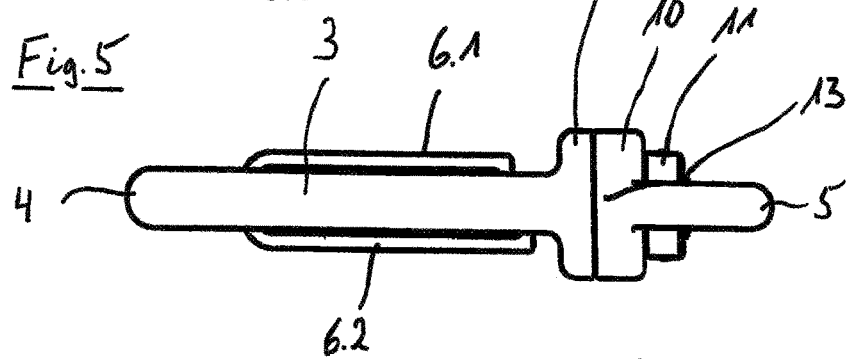
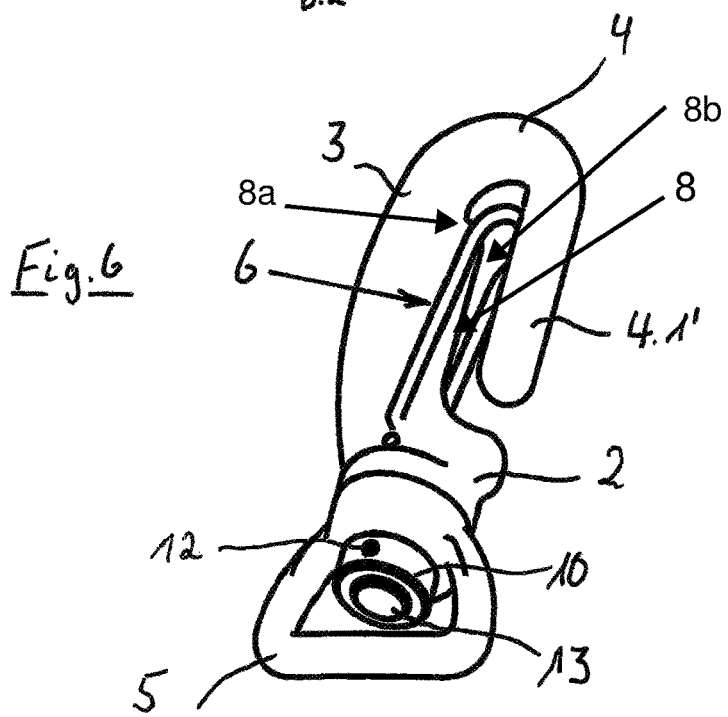

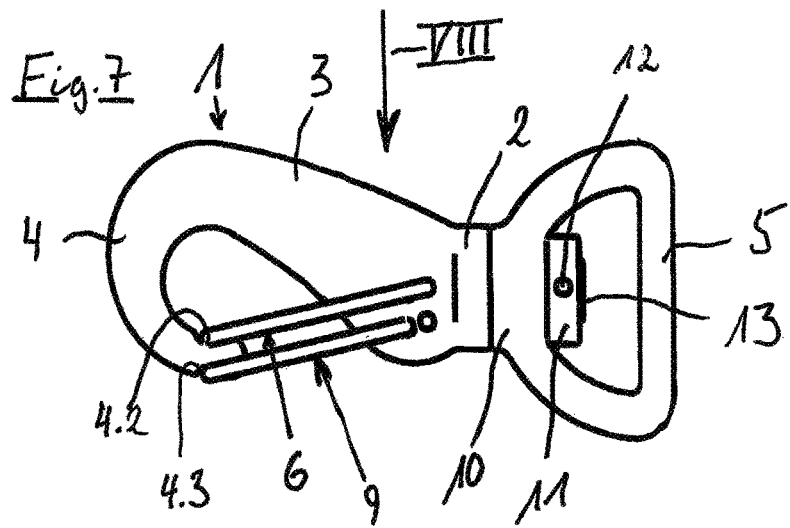
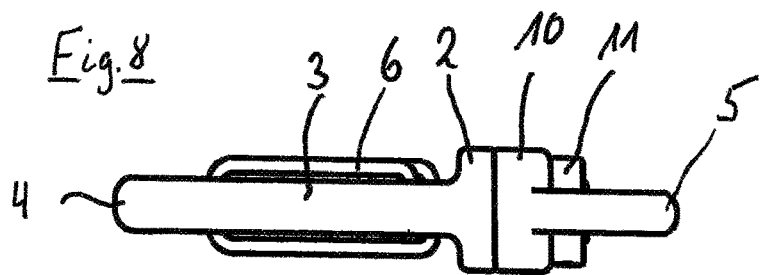
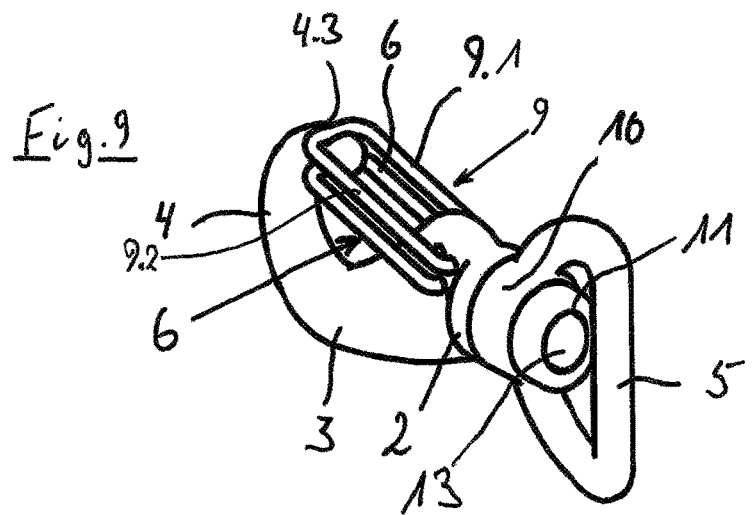

CARABINER

BACKGROUND OF THE INVENTION

The invention concerns a carabiner comprising a hock body comprising a foot section, a back section connected to the foot section, a top section which is connected to the back section and is bent like a hook in the direction of the foot section, a lug arranged at the foot section and a snap tongue pivotally linked to the foot section and having the form of a wire which is bent to a U-shackle and is made of spring steel. The U-limbs of the U-shackle have different lengths and the ends of the U-limbs are bent inwardly and are inserted into bearing openings which are arranged in the region of the foot section such that the snap tongue in the closed position of the carabiner contacts spring-loaded the inner surface of the top section which is bent in the direction of the foot section.

Such a carabiner is described in EP 1 522 748 B1. The known carabiner which can be used in various ways bears the risk, especially in extreme situations, that the snap tongue or snapper in case of extreme loads is pressed inwardly, such that a ring which is arranged in the carabiner is unintentionally released from the carabiner by pushing away the snap tongue out of its contact position against the inner surface of that part of the top section which is bent into the direction of the foot section.

Such risk of an unintentional opening of the carabiner exists especially in the case that a ring which is part of a pet or dog collar, is fastened to the carabiner and the pet, especially the dog, tries with extreme movements of its head to get released from the dog leash or dog belt which is fastened to the carabiner.

It is the object of this invention to provide an improved carabiner.

SUMMARY OF THE INVENTION

According to the present invention, a carabiner is proposed that is characterized by a retaining element preventing accidental displacement of the snap tongue out of its contact position against the inner surface of the end portion of the top section bent into the direction of the foot section.

According to a preferred embodiment of the invention an additional retaining element is provided in the form of a plate shaped projection which projects between the U-limbs of the snap tongue. This projection preferably is a plate which is connected partially to the inner surface of the foot section and partially to the inner surface of the back section of the hook body.

Such a plate shaped retaining element avoids reliably distortions and/or sideways movements of the snap tongue.

A modified embodiment of this invention is characterized in that the retaining element is a spring element which is pivotally mounted at the foot section against a spring force and which, in the closed condition of the carabiner, resiliently contacts the outer surface of the top section which is bent into the direction of the foot section.

A further modified embodiment of this invention is characterized in that the spring element is a snap tongue bent into the form of a U-shackle, the U-limbs of which have different lengths and the ends of which are bent inwardly and are inserted into bearing openings which are arranged in the foot section.

BRIEF DESCRIPTION OF THE DRAWINGS

The invention is described with reference to the drawings.

FIG. 4 shows an isometric presentation of a second embodiment of the carabiner.

FIG. 5 shows a top view in the direction of arrow V.

FIG. 6 shows an isometric presentation obliquely from the side and from below.

FIG. 7 shows a side view of a modified embodiment of the carabiner.

FIG. 8 shows a top view in the direction of arrow VIII.

FIG. 9 shows an isometric presentation of the carabiner according to the FIGS. 7 and 8 obliquely from the side and from below.

DESCRIPTION OF PREFERRED EMBODIMENTS

Figure 1:
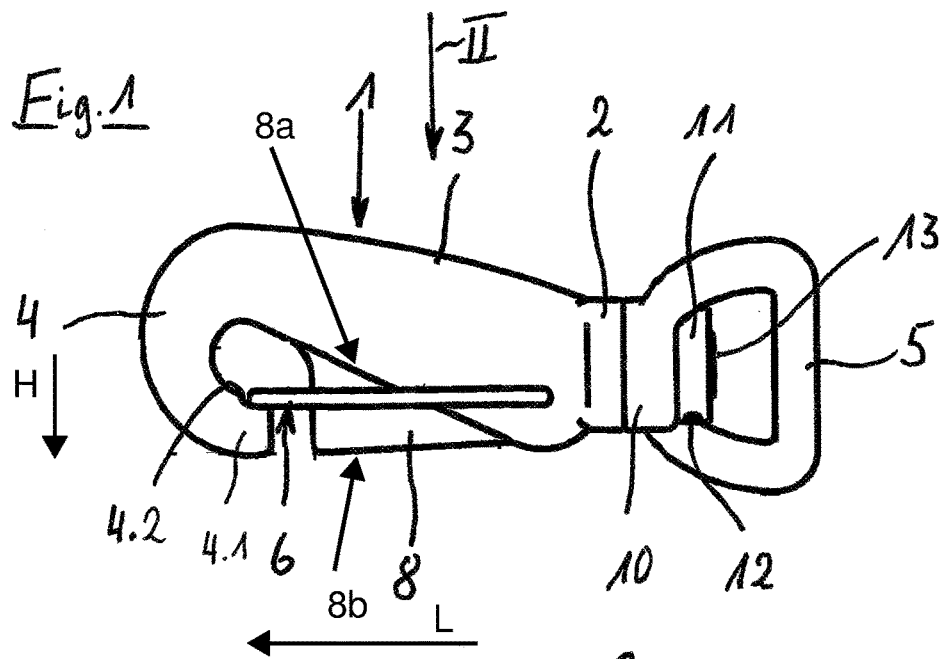
FIG. 1 shows an isometric presentation of a side view of a first embodiment of the carabiner.
Figure 2:
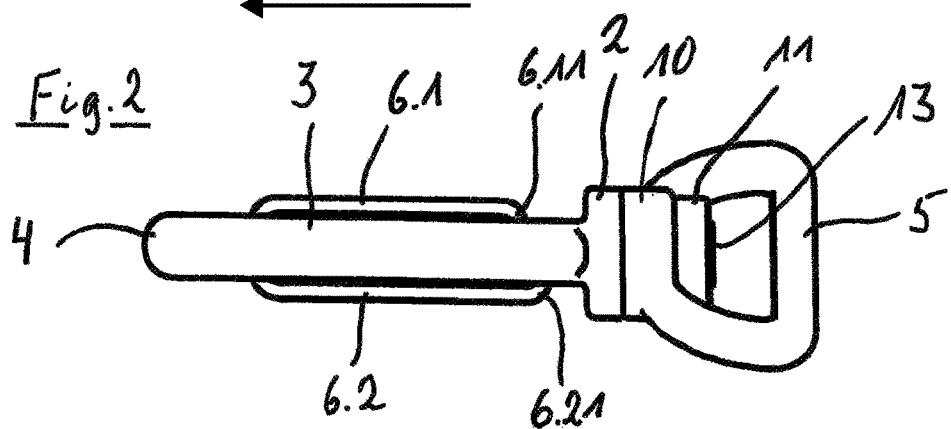
FIG. 2 shows a top view in the direction of arrow II.
Figure 3:
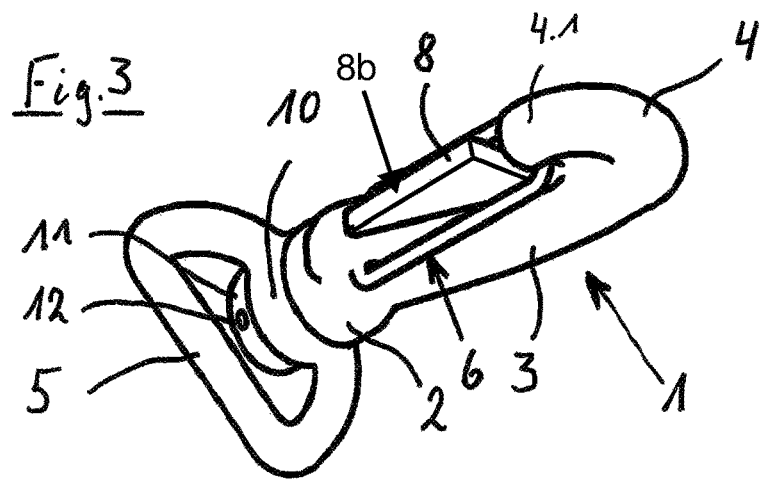
FIG. 3 shows an isometric presentation of the carabiner obliquely from the side and from below.

The carabiner shown in FIGS. 1 to 3 corresponds to the carabiner shown in FIGS. 4 to 6 as far as to the following features are concerned:

A hook body comprises
- a foot section 2,
- a back section 3, connected to the foot section 2,
- a top section 4 which is connected to the back section 3 and has a hook-like end 4.1 which is bent into the direction of the foot section 2,
- a bearing stud which is mounted to the foot section 2 and is directed outwardly and is represented by its head section 13, onto which bearing stud a retaining ring 11 is mounted, which supports a lug 5 and which is turnable relative to the foot section, which retaining ring 11 is secured on the bearing stud by means of a radially extending splint 12,
- a lug 5 mounted to the foot section 2 for attachment of a belt,
- a snap tongue 6 which is pivotally mounted to the foot section 2 and which is bent in the form of a U-profile from a hook like bent wire, wherein the U-profile limbs 6.1, 6.2 have different lengths and the ends of the U-profile limbs 6.1, 6.2 are bent inwardly to limb ends 6.11, 6.21, which are inserted into bearing openings which are arranged at the foot section 2 such that, in the closed position of the carabiner, the snap tongue 6 contacts spring loaded the inner surface of the top section 4 which is bent in the direction of the foot section 2.

The embodiments of the invention shown in FIGS. 1 to 3 and 4 to 6 contain a retaining element which extends in the direction of the top section 4 and is in the form of a plate 8, which has a slight distance to the U-profile limbs 6.1, 6.2 only. The plate 8 is connected with a length extension in a length direction L with a bottom end 8a partially to the inner surface of the foot section 2 and partially to the inner surface of the back section 3. The plate 8 comprises a top end 8b opposite the bottom end 8a and has height extension in a height direction H. The plate 8 which projects in the height direction H between the two U-limbs 6.1, 6.2 avoids distortion and/or tilting movements and in this way an unintentional opening of the carabiner.

According to FIGS. 4 to 6 instead of the relatively short end 4.1 a longer extension rod 4.1' is provided which rod 4.1 is connected to the top section 4 and extents in the direction of the foot section 1. A recess 4.2 is arranged adjacent to the bent end 4.1 of the top section 4. An outwardly bent part 6.3 that forms the base web of the U-profile snap tongue 6 engages into the recess 4.2.

According to FIGS. 7 to 9, a retaining element is provided in the form of a second U-profile spring element 9, which is rotatably mounted against a spring force in the foot section 2 and which, in the closed position of the carabiner, resiliently contacts the outer surface of the bent end 4.1 of the top section 4 with the base web of the U-profile.

The U-profile limbs 9.1, 9.2 of the second U-profile spring element 9 have different lengths, the ends of which U-profile limbs 9.1, 9.2 are bent inwardly forming bearing studs which are inserted into bearing openings which are arranged in the foot section 2.

The bearing openings for the snap tongue 6 and the retaining tongue 9 are each offset in the direction to the top section 4 whereby the spring force of the snap tongue 6 and of the retaining tongue 9 is effected.

For additional security purposes of the U-shaped snap tongue 6 and the additional retaining tongue 9, recesses 4.2 or 4.3 are respectively provided at the inner and outer surfaces of the inwardly bent ends of the top sections 4.

The specification incorporates by reference the entire disclosure of German priority document 10 2016 109 408.0 having a filing date of May 23, 2016.

While specific embodiments of the invention have been shown and described in detail to illustrate the inventive principles, it will be understood that the invention may be embodied otherwise without departing from such principles.

What is claimed is:

1. Carabiner comprising a hook body, the hook body (1) comprising:
   a foot section (2),
   a back section (3) connected to the foot section (2),
   a top section (4) which is connected to the back section (3) and is bent in a hook shape in the direction of the foot section (2),
   a lug (5) arranged at the foot section (2),
   a snap tongue (6) pivotally linked to the foot section (2) and having the form of a wire which is bent to a U-shackle and is made of spring steel, the U-limbs (6.1; 6.2) of the U-shackle having different lengths and the ends (6.11; 6.21) of the U-limbs (6.1; 6.2) are bent inwardly and are inserted into bearing openings which are arranged in the region of the foot section (2) such that the snap tongue (6) contacts spring-loaded in a contact position the inner surface of the top section (4) which is bent in the direction of the foot section (2), wherein the contact position of the snap tongue is a closed position of the carabiner,
   a retaining element (8) in the form of a plate (8), the plate (8) having a length extension in a length direction from the foot section (2) to the top section (4), wherein the plate (8) comprises a bottom end (8a) fixedly connected across the length extension of the plate to the back section (3) and to the foot section (2), wherein the plate (8) comprises a top end (8b) arranged opposite the bottom end and facing away from the back section (3), wherein the plate (8) has a height extension in a height direction from the bottom end (8a) to the top end (8b) and projects in the height direction (H) away from the back section (3) through a U-shaped opening delimited by the two U-limbs (6.1; 6.2) of the snap tongue in the closed position of the carabiner, wherein the plate (8) is positioned between the two U-limbs (6.1, 6.2) and secures the two U-limbs (6.1, 6.2) against distortion and tilting and against unintentional opening of the carabiner by accidental displacement of the snap tongue (6) out of the contact position.

2. Carabiner according to claim 1, further comprising a bearing stud (13), mounted at the foot section (2) and directed outwardly; a bearing ring (10) mounted on the bearing stud (13) and supporting the lug (5); and a retaining ring (11) mounted on the bearing stud (13), wherein the retaining ring (11) is secured on the bearing stud (13) by a radially extending splint (12).

3. Carabiner according to claim 2, wherein the bearing ring (10) is turnably mounted on the bearing stud (13).

4. Carabiner according to claim 1, wherein the bearing openings which are arranged at the foot section (2) and which serve for the insertion of the ends (6.11; 6.21) of the U-limbs (6.1; 6.2) are offset in the direction of the top section (4).

* * * * *